Feb. 22, 1949. R. WIRTH 2,462,701
POWER SHEAR AND SPRAYER
Filed Oct. 10, 1945 3 Sheets-Sheet 1

Inventor
Rand Wirth
By Philip A. Friedell
Attorney

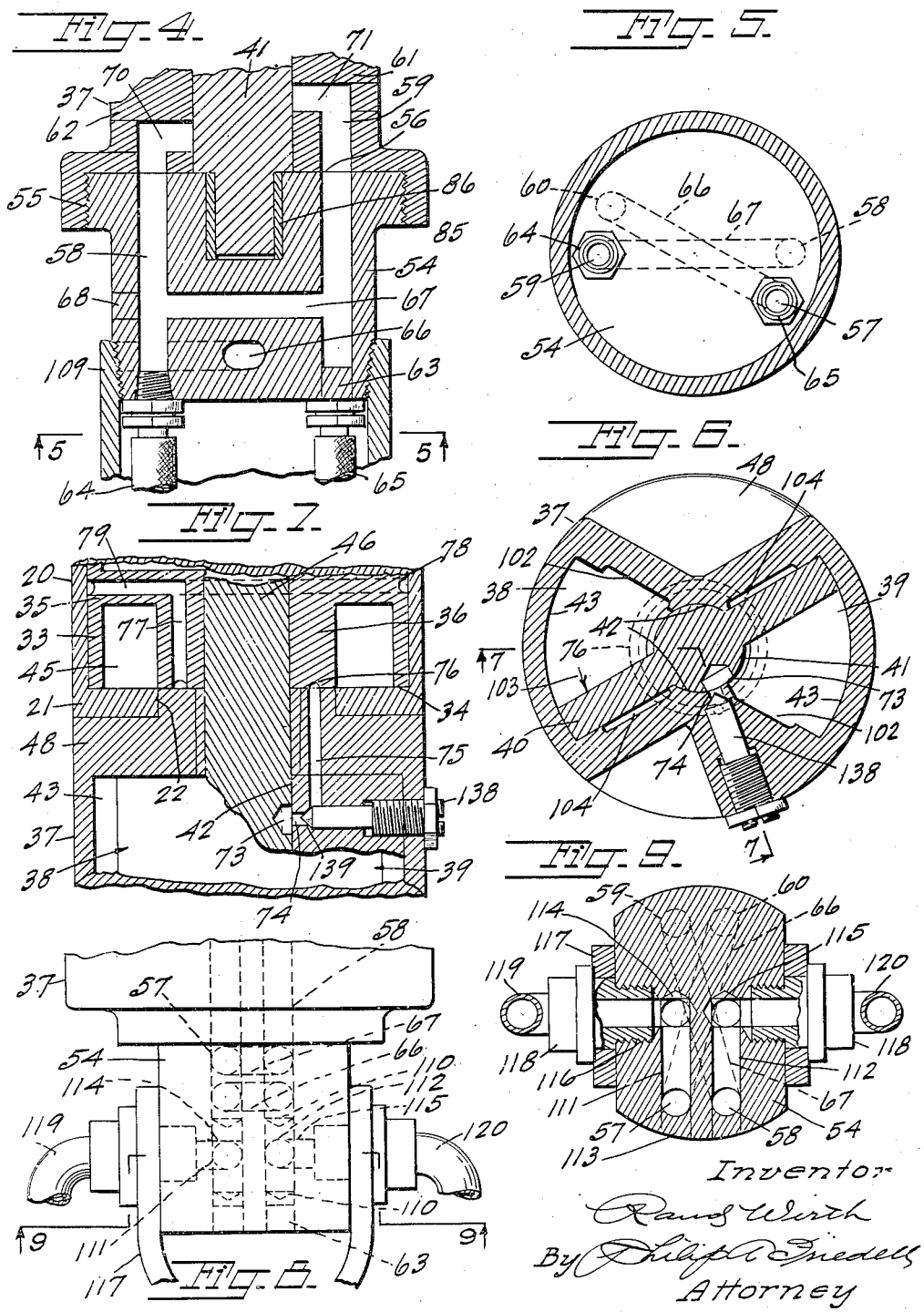

Feb. 22, 1949.    R. WIRTH    2,462,701
POWER SHEAR AND SPRAYER
Filed Oct. 10, 1945    3 Sheets-Sheet 3
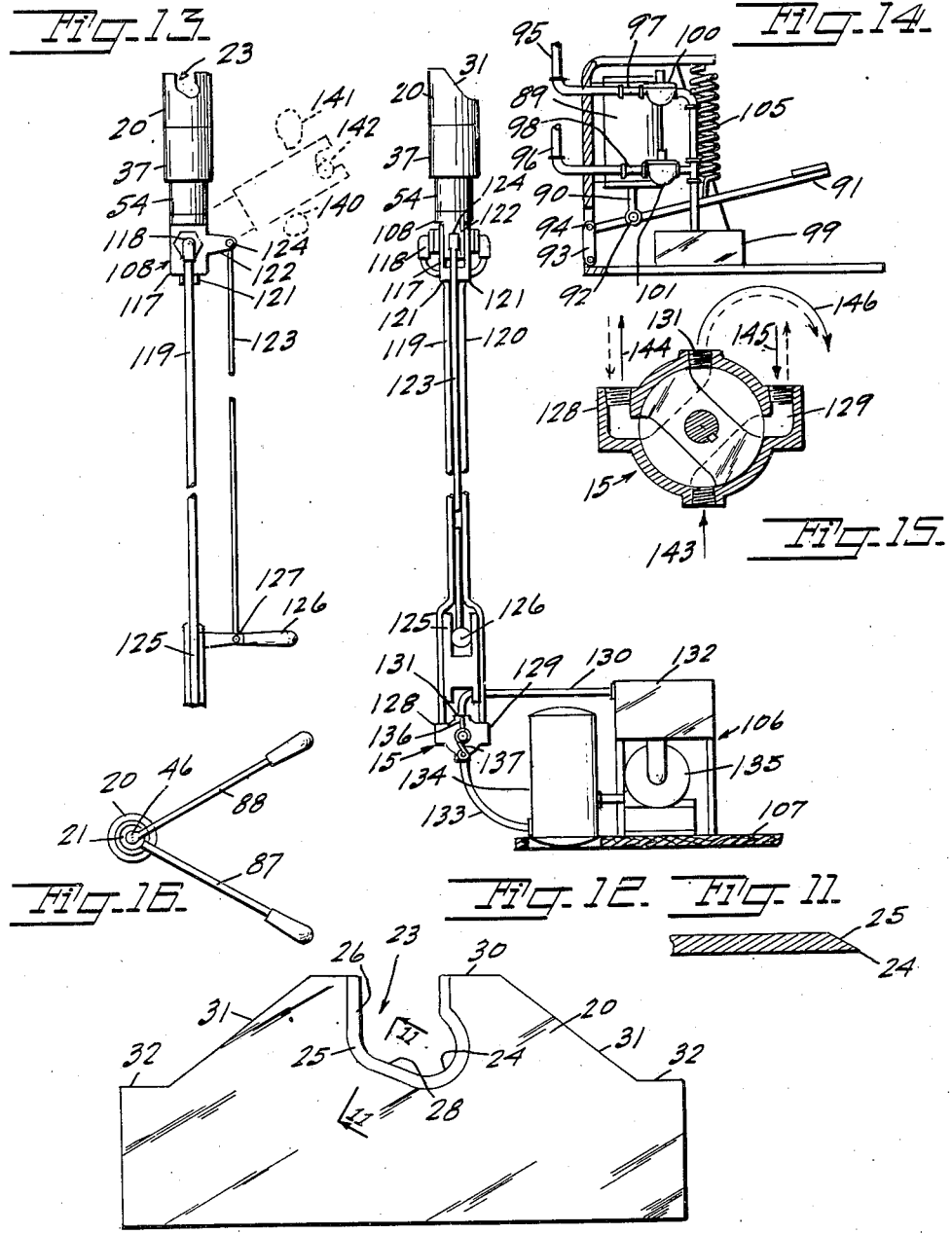

Patented Feb. 22, 1949

2,462,701

UNITED STATES PATENT OFFICE 2,462,701

POWER SHEAR AND SPRAYER

Rand Wirth, Oakland, Calif.

Application October 10, 1945, Serial No. 621,459

9 Claims. (Cl. 47—1)

This invention, a power shear and sprayer, is capable of being operated through the medium of a prime mover or through manual application of power, and is equally adaptable for shearing bars, rods, cables, rope; clipping off projecting ends of bolts and reinforcing rods and the like; and for pruning trees and shrubs.

It can clip the projecting ends of bolts flush with the face of the nut, reinforcing rods flush with the face of the concrete, and branches and twigs right up to the crotch, or at any desired other point.

When used for pruning trees, it can be made to spray the severance face with antiseptic immediately following severance, and when shearing metals, it can be made to spray the sheared face with oil or other liquid to prevent oxidation, this spraying taking place coincident with completion of shearing.

The shear is composed of an absolute minimum number of parts and can be designed for any desired multiplication of the available power, and to suit the specific materials or sections to be sheared. It is extremely simple to operate, irrespective of whether it is hand operated, operated through manually-developed power, or through power developed through a prime mover, which prime mover may consist of any available source, such as an electric motor or an internal combustion engine, and in the case of manually-developed power, the power may be developed through either, a hand-operated or a foot-operated pump, no controls other than the pump being required in the case of manually-developed power, and only a four-way valve having a lever movable to two positions being required for prime-mover-developed power.

The objects and advantages of the invention are as follows:

First, to provide a shear which is designable for hand operation or through prime-mover-developed power or manually-developed power at will.

Second, to provide a shear as outlined which is designable for shearing any type of material including metals, plastics, and rope, or for pruning.

Third, to provide a shear as outlined which is capable of clipping bolts and rods flush with the face from which they project, and capable of severing twigs and branches right at the crotch if desired.

Fourth, to provide a shear as outlined with means for spraying the area of shear or severance with a suitable solution to prevent oxidation in the case of metals, and in the case of trees or shrubs, to spray with a suitable antiseptic solution, with the spraying automatically performed immediately following the severance.

Fifth, to provide a shear as outlined in which the means for spraying is controllable as to the volume of fluid ejected with each operation, and for terminating spraying, at will.

Sixth, to provide a shear as outlined with a swivel joint controllable as to angularity of the shear head at will so that the member to be sheared may be approached from the most easily accessible direction, and so that in pruning the shear may be brought into cooperation with the branch to be sheared off, from either, above, below, or from the side.

Seventh, to provide a shear as outlined which can be operated through the medium of the spray unit of a conventional spray rig, using the conventional spray or antiseptic solution under pressure as the medium of power for the shear.

Eighth, to provide a shear of the rotary-blade type with shear edges which combine retaining and positioning means and simultaneously a thrust cut on one side, a shear cut underneath followed by a thrust cut on the other side, thus providing two types of shearing action and on three sides of the member being sheared.

Ninth, to provide a shear as outlined which consists of a minimum number of parts and which is simple in construction and operation, and which cannot readily become damaged or get out of order.

In describing the invention reference will be made to the accompanying drawings, in which:

Fig. 4 is a section taken on line 4—4 of Fig. 3.

Fig. 5 is a section taken on line 5—5 of Fig. 4.

Fig. 6 is a section taken on line 6—6 of Fig. 1, illustrating the spray passage and control.

Fig. 7 is a section taken on line 7—7 of Fig. 6.

Fig. 8 is a side elevation of the swivel connection for the shear head.

Fig. 9 is a section taken on line 9—9 of Fig. 8, showing the swivel connections and passages to the shear motor.

Fig. 10 is a development of one of the shear blades.

Fig. 11 is a section taken on line 11—11 of Fig. 10.

Fig. 12 is a front elevation of the invention, shown with swivel shear head connection and control therefor, and power connections to a spray unit of a conventional spray rig, as used for pruning.

Fig. 13 is a side elevation of Fig. 12, illustrating angular adjustment of the shear head.

Fig. 14 illustrates one form of manually developed power means for operating the shear.

Fig. 15 illustrates a suitable valve and connections for controlling operation of the shear.

Fig. 16 illustrates the hand-operable form of the invention.

Figure 1:
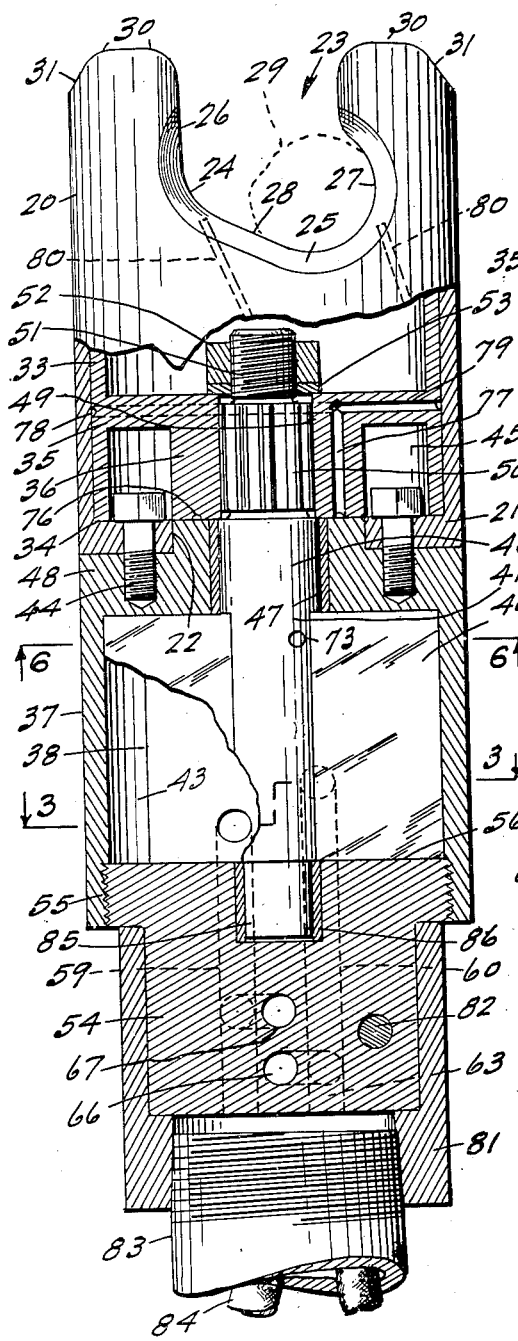
Fig. 1 is a vertical section through the shear head.
Figure 2:
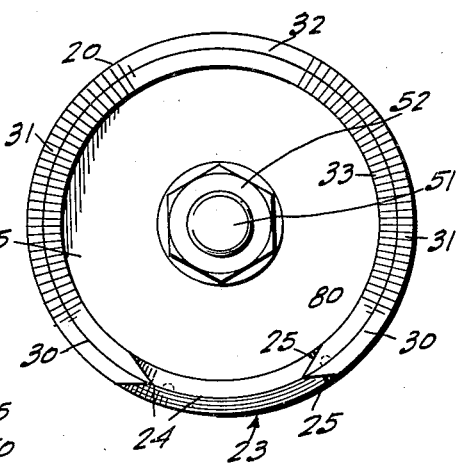
Fig. 2 is a top plan view of Fig. 1.
Figure 3:
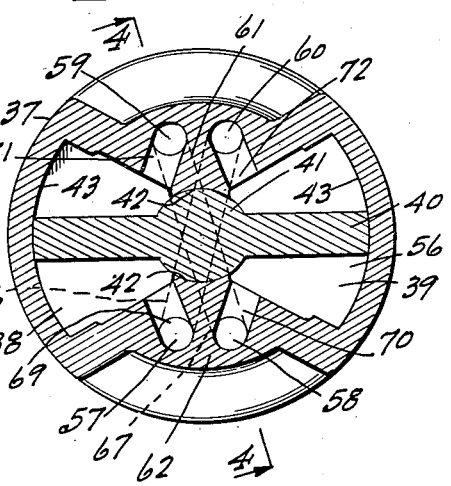
Fig. 3 is a section taken on line 3—3 of Fig. 1.

The shear proper consists of a pair of cylindrical blades one rotatable within and relative to the other, including an outer blade 20 having a base 21 provided with an axial bore 22, and having a shear recess 23 formed downward from the upper end with the edges of the recess suitably formed to a cutting edge 24 such as by beveling indicated at 25; this shear recess having a straight side 26 with the upper portion of the opposite side also straight and therebelow being circumferentially recessed as indicated at 27 and with the bottom of the shear recess sloped upwardly toward the side 26 as indicated at 28 to form a retaining recess for the object 29 to be sheared, at 27, and coincidently provide thrust shear through the edge 27, draw shear through the edge 28 on the under side of the object, and finally thrust shear on the opposite side of the object through the cutting edge 26, thus retaining the object while applying thrust shear from two opposite directions and draw shear from a third direction. Sufficient material is allowed on each side of the recess as indicated at 30 to provide the necessary strength and rigidity, beyond which the blade is tapered back to a level slightly below the lowest portion of the cutting edge, as indicated at 31 and 32 so as to offer no obstruction to the object to be sheared; and an inner blade 33 substantially identical to the outer blade so far as the shear recess and cutting edges are concerned with the exception that the cutting edge bevels are formed opposite to bring the sharp edges 24 into cooperative relation between the two shear blades. The bottom of the inner blade rests on the top surface of the base 21 as indicated at 34, and the base 35 for the inner blade is located in space relation to the bottom and has a central depending hub 36.

The motor consists of a housing 37 having diametric circular sector power chambers 38 and 39 in which operates the double vane 40 having a hub 41 rotatably cooperating with the opposed bearing surfaces 42, and with the outer edges of the vane cooperating with the respective arcuate surfaces 43, with the included angle of the chambers limiting the degree of movement of the vane. The outer shear blade is suitably secured to the motor housing by suitable means such as the cap screws 44, the recess 45 suitably clearing the heads and for which purpose this recess was formed, and with the screws readily removable and replaceable when the inner blade is removed.

The hub 41 extends upwardly to form a shaft 46, which rotatably fits in a bearing 47 in the head 48 of the motor housing which has a hub fitting in the bore 22 in the outer shear blade base and which hub extends exactly to the upper surface of the base 21 so as to form a plane surface therebetween for simultaneous cooperation with the bottom of the inner blade and with the bottom surface of the hub 36.

The hub 36 is axially bored and provided with a keyway or is broached as indicated at 49, and the shaft 46 extends upwardly therethrough and is keyed or splined as indicated at 50 to lock the inner blade for rotation with the shaft and vane, and this shaft terminates in a threaded portion 51 for the nut 52 for immovably securing the inner blade on the shaft, a suitable lock washer 53 being interposed as indicated.

The distributor 54 is suitably secured to the lower end of the motor housing, such as through a threaded connection 55 and its upper surface 56 forms the bottom for the power chambers, with the upper and lower ends of the vane respectively slidably cooperating with the under surface of the head 48 and top surface 56 of the distributor. Four holes 57 to 60 extend upwardly from the lower end of the distributor, into the hub sections 61 and 62 of the motor housing, and two of these holes are blocked off at the lower end as indicated at 63, and suitable connections for a source of fluid under pressure are provided for the open holes as indicated at 64 and 65. Diagonal interconnecting holes 66 and 67 connect diametrically related vertical passages, and are blocked off at their ends as indicated at 68.

Ports 69 to 72 communicate between the upper ends of the vertical passages and the respective sides of the respective power chambers.

Means for spraying the severed end of the material sheared or pruned consists of a recess 73 formed in the side of the hub 41 and opening only into the power chamber when the vane has about reached its terminal of shear movement and then communicating with a horizontal passage 74 which in turn communicates through a vertical passage 75, with a concentric groove 76 formed in the underside of the hub of the inner shear blade. A passage 77 is formed vertically through the inner blade hub and communicates with the groove 76, and with a peripheral groove 78 formed about the inner blade, through a passage 79, and grooves 80 formed in the outside surface of the inner blade communicate with the groove 78 and extend almost to the cutting edge 24 of the blade, to form passages between the outer and inner blades to eject fluid into the shear recess.

If a rigid handle or support is to be used, a coupling 81 fits over the distributor, is held in position by a bolt 82 passing chordally through the distributor and coupling, and a suitable threaded connection is provided for the tube or pipe 83, which simultaneously houses the tubes 84 which communicate with the passage 57 and 59.

The vane has a lower shaft extension 85 which is rotatable in a bearing 86 supported in the upper end of the distributor.

In its simplest form, the shear consists only of the inner and outer blades with one handle 87 having a hub formed integral with the base 21 and another handle 88 having a hub replacing the vane 40 and with the shaft 46 formed integral therewith. This type is for manual operation only and shearing is carried out by forcing the handles toward each other.

For manually-developed power operation, a valveless pump 89, Fig. 14, is used. The piston is connected through its connecting rod 90 with a foot pedal 91 as indicated at 92, with suitable means provided as indicated at 93 to compensate for the arcuate movement of the pedal pivot 94. Flexible tubing, as 64 or 84, communicates between the distributor and the respective ends of the pump as indicated at 95 and 96 through tees 97 and 98, and these T's are in controlled communication with a sump 99 through the respective spring-loaded check valves 100 and 101, these check valves closing against discharge from the pump but opening only under predetermined suction.

With the lines 95 and 96 connected respectively to the distributor ports as indicated at 64 and 65 in Figs. 4 and 5, and a supply of fluid in the sump 99, depression of the treadle will force the fluid in the lower portion of the cylinder 89 through tube 96 to the distributor and thence to the sides 102 of the power chambers (Fig. 6) forcing the vane to the position shown with the pressure applied as indicated by the arrow 103 and with the fluid on the other side 104 of the vane forced back to the other end of the pump cylinder through the ling 95. In the event that there is insufficient fluid to fill the chamber recesses 104, tube 95, and the upper end of the cylinder, the deficiency will be supplied through suction from the sump past the check valve 100. The same applies for the other side of the cylinder when the treadle is released and the piston is returned to its initial or raised position by the spring 105. Thus, depression of the treadle will operate the shear and replenish any lost fluid in the return side of the line, and release of the treadle will be followed by operation through the spring to return the shear to its initial position and replenish any lost fluid in the power side of the line and cylinder.

Figs. 12 and 13 illustrate a complete assembly of a power pruning shear, in which the shear is operable by a conventional spray unit 106 mounted on a spray rig 107. It also illustrates a modification in which the shear head is angularly adjustable at will, and in which the tubular staff with enclosed flexible tubing shown in previous illustrations are replaced by a pair of tubes which function coincidently as the staff and as carriers for the fluid. It illustrates a separate pivotal head 108 for the shear and which would be substituted for the pipe 83, Fig. 1, or 109 Fig. 4. However, this extra connection can be dispensed with as illustrated in Figs. 8 and 9 which shows the distributor modified to function as the pivotal connection.

This modification of the distributor includes the vertical passages 57 to 60 but which do not in any case extend through, but terminate in spaced relation to, the bottom of the distributor as indicated at 110, with the diametric interconnecting passages 66 and 67 formed as previously disclosed.

At a level below both of the diametric passages, two parallel passages 111 and 112 cut through two of the passages, as 57 and 58, and extend to the center of the distributor, being plugged at their outer ends as indicated at 113. Diametric passages 114 and 115 intersect the parallel passages and have each a threaded counterbore 116. A yoke 117 fits about the distributor and has its legs pivotally secured thereto by a swivel coupling 118 for the tubes 119 and 120. The staff such as a pipe 109 can be fixed to the yoke, or as illustrated in Figs. 12 and 13, the tubes are formed about the underside of the yoke and rigidly retained in fixed relation by ears 121 formed from the yoke and between which the respective tubes are gripped.

A lever 122 is integral with the attachment (Figs. 12 and 13) or distributor (Figs. 8 and 9) and has a connecting rod 123 pivotally connected thereto at 124. A hand grip 125 is formed at the lower ends of the tubes or inserted therebetween, and an operating lever 126 is pivoted thereto and has a connection at 127 to the connecting rod 123. Obviously there are other methods by which adjustment of the shear head can be carried out such as a shaft and bevel gearing (not shown), the simplest form being illustrated.

Mounted at the terminal ends of the two tubes 119 and 120 is a four-way valve with the tubes connected to two of the terminals 128 and 129, a discharge tube 130 connecting to a third terminal 131 and discharging into a storage tank or sump 132, and a power tube 133 connecting to the fourth terminal on the valve and communicating with a pressure tank 134 which is supplied with fluid by a suitable pumping unit 135 having its intake in communication with the storage tank or sump 132. The four-way valve has a lever 136 which is normally retained in a predetermined position by a spring 137.

When the shear is to be used for cutting metal, fibre, or plastic sections, the cutting edges 24 are modified to suit the specific material and shape to be cut, and a suitable handle 83 or 109 is provided as may be most convenient for the specific work to be done.

Operation of the invention will be explained on the basis of the pruning shear illustrated in Figs. 12 and 13.

With the pump unit 135 operating, the tank 134 is provided with a constant supply of fluid, such as antiseptic or insecticide, under pressure. The valve 136 Fig. 7, is adjusted for the volume of fluid to be ejected to the area of severance. If there is to be no ejection of fluid, the valve can be closed down to its seat 139.

Normally the valve control lever 136 is in the position shown in Fig. 12, and the valve midway of the positions indicated respectively by solid and dotted lines in Fig. 15. The shear head is adjusted by means of the lever 126 when it is necessary to cut a twig or branch from some specific direction, making it possible to insert the head between branches as indicated at 140 and 141 to reach another branch 142, and cut from above or below, as may be most convenient or desirable.

With the branch in the shear recess as indicated at 142, the lever 136 is pushed to the right which changes the valve Fig. 15 to the position shown by the solid lines, so that fluid flows from the pressure tank 134 through line 133, to terminal 128, as indicated by arrows 143 and 144, tube 119, swivel connection 118, passages 111, 57, 66 and 60, 69 and 72 to the respective power chambers, forcing the vane to the position shown in Fig. 6 and operating the shear through the shaft 50, with the inclined surface 28 of one blade performing a draw cut on the underside of the branch and thrust cuts from both sides which prevents stripping of bark because the cut is substantially circumferential. As the vane moves to the position shown in Fig. 6, the fluid on the other side of the vane is forced out through the passages 70, 71, 58, 59 and 67, 112, tube 120, valve 15 as indicated by arrows 145 and 146 through line 130 to the sump 132, and as the vane nearly reaches its terminal of movement it uncovers the port 73 to eject fluid to the severed edge of the branch, passing through the passages 74, 75, groove 76, passages 77 and 79 to groove 78, and thence up through the grooves 80 (Fig. 1) to the cutting edges, the terminal end of at least one of which has been uncovered through relative movement of the shear blades to eject directly at the line of shear.

As soon as the cut is completed, the lever 136 is released, the spring 137 returns the valve to its neutral position between the dotted and solid positions shown in Fig. 15, with the flow of fluid stopped including that through the ejection passages.

Movement of the lever 136 to the left reverses the motor and returns the shearing elements to their initial position, and release of the lever is followed by its return to its neutral position through the medium of the spring, and which locks the fluid in the shear motor to keep the blades in their open position. Obviously, the spring can be made to return the lever to a position in which the power is normally continuously applied to keep the shear blades open, and which would not affect the results in any way, because no fluid can be ejected except at the terminal end of the cut, the initial returning movement of the vane closing the port to the ejector. It will be noted that the port 74 is located close to the power side of the hub and the recess 73 is only circumferentially long enough to span the intervening portion of the hub and not long enough to span the other side, so that ejection can only take place at that one particular stage.

I claim:

1. A shear comprising, a cylinder, two cylindrical shear members having each a shear recess formed in one side provided with cutting edges, and with the other side cut away to clear extensions of objects to be sheared, and with one shear member axially mounted on said cylinder and with the other shear member rotatable within and relative to the one member, and sector type chambers formed in said cylinder and a vane operating therein and operatively connected to said other of said shear members for relatively rotating said shear members in one direction for shearing and in the reverse direction for return of the blades to an initial position.

2. A shear comprising; two cylindrical shear members consisting of an outer shear member and an inner shear member having cooperative cutting edges, a cylinder having said outer shear member axially mounted thereon and fluid power driving means comprising a vane-type piston in said cylinder and having connection for driving said inner shear member, and a supply of fluid under pressure for driving said vane-type piston, and a passage controlled by said vane-type piston for ejection of a portion of the fluid from said cylinder to the shearing area coincident with completion of a shearing operation.

3. A shear, comprising; a cylinder having sector-type chambers formed therein, two cylindrical shear members each having a cutting and retaining recess formed inwardly from the end and with shear edges formed about the recess and with the side of the shear members opposite to the recess being removed to clear an object to be sheared, and consisting of an outer shear member axially mounted on said cylinder, and an inner shear member rotatable within said outer shear member, and a vane-type piston in said cylinder for rotatably reciprocating said inner shear member, for shearing and for return to an initial open position, and a supply of fluid and control means therefor for controlling operation of said vane-type piston, and passages leading from one of said chambers to said cutting edges and controlled by movement of said vane-type piston for ejecting fluid from said cutting edges when the cutting edges have completed a shearing operation.

4. Means for relatively rotatably reciprocating two cylindrical members each having cutting edges, and including an outer shear member, and an inner shear member rotatable within the outer shear member; a housing having said outer shear member axially mounted thereon and having diametric circular sector power chambers formed therein with intervening axial bearing and having a port opening into each side of each chamber; a vane having a central hub bearing in said axial bearing and dividing said power chambers from each other, and a shaft extension from said hub and having the inner shear member fixed thereon; and a supply of fluid under pressure and fluid passages leading to said ports and control means for controlling flow of fluid to the respective ports through said passages.

5. A structure as defined in claim 4; spray means for spraying the sheared edge of a branch or the like comprising a passage formed in said structure and leading from one of said power chambers to the cutting edges and controlled for delivery of fluid from said one of said power chambers by said vane for delivery when said vane has reached a predetermined position in a cycle of operation.

6. A shear, comprising; a shear head consisting of two cylindrical shear members having each a retaining and shearing recess and one rotatably supported in the other; a housing having circular sector power chambers formed therein from a common axis and having a common axial bearing; a vane operable in said power chambers and having a central hub bearing in said common axial bearing and dividing said power chambers from each other, and having an axial shaft extension with the inner cylindrical shear member fixed thereon; a port leading into each radial side of each power chamber; and a base for said housing and having passages leading respectively to diametrically related ones of said ports, and fluid connections for said passages.

7. A structure as defined in claim 6; a fluid passage extending from one of said power chambers between said cylindrical shear members to said retaining and shearing recess and normally closed by said vane and opened through movement of said vane to a predetermined position, for spraying fluid into the shear area coincident with completion of a shearing movement of said inner cylindrical shear member.

8. A structure as defined in claim 6; a fluid passage extending from one of said power chambers between said cylindrical shear members to said retaining and shearing recess and normally closed by said vane and opened through movement of said vane to a predetermined position, for spraying fluid into the shear area coincident with completion of a shearing movement of said inner cylindrical shear member; a staff having one end pivotally connected to said base and manually-operable means for angularly adjusting said shear head relative to said staff at will.

9. A shear, comprising; a pair of cylindrical shear members including an outer shear member and an inner shear member each having a receiving recess with surrounding cutting edges formed in one side and with the opposite side cut away to clear an object to be sheared when inserted in the receiving recess, with said inner shear member rotatably bearing in said outer shear member; a housing having said outer shear member mounted thereon and having a pair of diametrically related circular sector power chambers formed therein with intervening bearing and having a port opening into each radial side of each power chamber; a vane interiorly spanning said power chambers and having a central hub bearing in said intervening bearing and dividing said power chambers; a distributor having passages diametrically pairing said ports and having terminal connections for a source of fluid under pressure, and having said housing mounted thereon; and a shaft extension from said hub and having said inner shear member fixed thereon for rotation with said vane.

RAND WIRTH.

REFERENCES CITED

The following references are of record in the file of this patent:

UNITED STATES PATENTS

| Number | Name | Date |
|---|---|---|
| 131,108 | McElhaney | Sept. 3, 1872 |
| 648,695 | Krone | May 1, 1900 |
| 2,075,341 | Goodman | Mar. 30, 1937 |
| 2,228,635 | Magennis | Jan. 14, 1941 |
| 2,259,764 | Meyers | Oct. 21, 1941 |
| 2,268,728 | Toop | Jan. 6, 1942 |

FOREIGN PATENTS

| Number | Country | Date |
|---|---|---|
| 476,620 | France | May 22, 1915 |
| 430,801 | Germany | June 25, 1926 |
| 254,514 | Italy | Aug. 2, 1927 |